Patented Sept. 17, 1935

2,014,440

UNITED STATES PATENT OFFICE 2,014,440

METHOD OF HEAT TREATING PISTON RINGS

Charles L. Lee, Dayton, Ohio, assignor to General Motors Corporation, Detroit, Mich., a corporation of Delaware No Drawing. Application January 13, 1928, Serial No. 246,621

1 Claim. (Cl. 148—21.5)

This invention relates to packing rings adapted for use on the pistons of internal combustion engines and particularly to those of the type disclosed in the application of Charles R. Short, Ser. No. 651,687, filed July 16, 1923.

The inherent advantages as regards elasticity, toughness, uniformity of structure, the ability to withstand the temperatures which are encountered in a cylinder of an internal combustion engine without substantial change in these properties, and workability of steel over cast iron as a piston ring material have long been recognized. In spite of all of these obvious advantages of steel over cast iron as a piston ring material, it has been the practice to make piston rings of cast iron due mainly to the difficulty of producing a steel piston ring which did not cause scoring or excessive abrasion of the walls of the cylinder in which it was used or which was not itself excessively abraded during use.

It is an object of this invention to provide a method of producing a steel packing ring which is capable of forming and maintaining a good bearing surface with the walls of the cylinder in which it is used, i. e. one which does not cause scoring or excessive abrasion of the walls of the cylinder in which it is used and is not itself excessively abraded during use.

Other objects of the invention will be apparent from a perusal of the following specification.

In making packing rings in accordance with my invention, I prefer to start with a rod or wire of substantially the same shape in cross section as that of the completed ring and of sufficiently larger area to allow for grinding. However, if wire or rod of this cross section is not available, wire or rod of other cross section may be used as the raw material. In this case, the first step will be to reduce the wire or rod to the proper cross section by rolling, drawing, or any other suitable operation.

The wire or rod from which the rings are to be made may be of steel which contains 0.45 per cent or more, or perhaps, under some conditions even less, of carbon or of alloy or "special" steels, such as chromium steel, tungsten steel, vanadium steel and chrome-vanadium steel, which have less tendency than ordinary carbon steels to lose their elasticity at elevated temperatures. But I prefer that this wire or rod shall be of carbon steel containing 0.8–0.9 per cent carbon, as I have found that rings which are entirely satisfactory as regards elasticity, toughness, the ability to withstand the temperatures encountered in the cylinder of an internal combustion engine without appreciable change in these properties, as well as their ability to form and maintain a good bearing surface with the walls of the cylinder in which they are used, may be made from this material by the method hereinafter described.

As a preliminary step, the wire or rod from which the ring is to be made, which is slightly larger in cross sectional area than the completed ring, may be reduced, by annealing or otherwise, to a malleable condition, if it is not already in this condition.

The wire is then wound or coiled into a close-pitched helix of substantially the same diameter as the finished ring with the side of the wire or rod which is to form the outer circumferential wall of the ring on the outside.

In the next operation, the helix formed in the preceding operation is split longitudinally so as to produce therefrom a plurality of rings.

These rings may be somewhat irregular in shape and due to the fact that they are each a severed turn of a spiral the ends may not be in alignment. Furthermore, the rings may not be of the desired shape radially and may be somewhat dished or twisted between their ends.

To remove any of these defects which may exist and to bring it to the desired shape radially, each ring is subjected to a coining operation. This operation is preferably performed in a die. In this operation it is only necessary to apply sufficient pressure to the ring to remove irregularities therefrom and strain it beyond its elastic limit so that it will retain the shape which it is given in the die after the pressure is removed.

After the completion of the coining operation, the ring is of the desired shape, all irregularities being removed. However, the working may have set up internal strains in the metal which might later cause deformation of the ring and the metal is too soft and lacks sufficient resiliency to form a good piston ring.

To remove any internal strains in the metal of which the ring is made, to harden it sufficiently so that it will be capable of forming and maintaining a good bearing surface with the walls of the cylinder, to toughen it, and to impart sufficient resiliency to it so that it will maintain gas tight contact with the walls of the cylinder in which it is used, the ring is subjected to a heat treatment. It is desirable that the ring be held firmly during the heat treatment to prevent distortion which is otherwise likely to occur. It is obvious that the heat treatment which the ring should be given will depend upon the steel of which it is made and that an attempt to prescribe the proper heat treatment for the various steels of which the ring may be made would only result in lengthening the specification interminably without serving any useful purpose as the heat treatment necessary to give any of the commercial steels any properties which it is capable of assuming is well known to metallurgists. However, I may state that I have found that quenching in oil at 1450° and drawing at 300° is a satisfactory treatment for a ring containing approximately 0.90 per cent carbon.

After the heat treating operation is completed, the ring or rings are preferably ground and the slots in them milled but as both of the steps are common and well known in the art it is unnecessary to discuss them here. I apprehend that both the grinding and the milling operations may be omitted. I do not, however, consider it desirable to eliminate the grinding operation though the operation of milling the slot may be eliminated if sufficient care is taken in the coiling, or winding, and cutting operations.

It appears obvious that the ability of a piston ring to form and maintain a good bearing surface with the walls of the cylinder in which it is used is controlled by the condition of the cylinder wall bearing surface of the ring. It follows naturally from this that if a ring is satisfactory in all respects except its ability to form and maintain a good bearing surface with the walls of the cylinder in which it is used it will be entirely satisfactory if its cylinder wall bearing surface is brought to such a condition that it is capable of forming and maintaining a good bearing surface with the walls of the cylinder. Thus, if a ring of a steel which even after heat treatment is incapable of forming and maintaining a good bearing surface with the walls of a cylinder but is otherwise satisfactory is carburized or case hardened before being heat treated, it will form an entirely satisfactory piston ring after heat treatment.

Though I have described and illustrated a suitable method by which my ring may be made I apprehend that certain modifications of the method may become desirable. I, therefore, wish it understood that the scope of my invention is defined not by the matter described but includes all modifications within the scope of the appended claim.

I claim:

The step in the method of making a packing ring of approximately .9 percent carbon steel which consists of heat treating the ring by quenching it in oil at about 1450 degrees and then drawing it at about 300 degrees.

CHARLES L. LEE.